United States Patent
Pundoor

(10) Patent No.: US 7,448,009 B2
(45) Date of Patent: Nov. 4, 2008

(54) METHOD OF LEAKAGE OPTIMIZATION IN INTEGRATED CIRCUIT DESIGN

(75) Inventor: Shrikrishna Pundoor, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 204 days.

(21) Appl. No.: 11/619,341

(22) Filed: Jan. 3, 2007

(65) Prior Publication Data

US 2007/0180415 A1    Aug. 2, 2007

Related U.S. Application Data

(60) Provisional application No. 60/755,824, filed on Jan. 3, 2006.

(51) Int. Cl.
*G06F 17/50* (2006.01)

(52) U.S. Cl. .......... 716/6; 716/1; 716/2; 716/18
(58) Field of Classification Search .......... 716/1, 716/2, 6, 18
See application file for complete search history.

(56) References Cited

U.S. PATENT DOCUMENTS

2004/0230924 A1* 11/2004 Williams et al. .......... 716/2

* cited by examiner

*Primary Examiner*—Thuan Do
(74) *Attorney, Agent, or Firm*—Robert D. Marshall, Jr.; W. James Brady; Frederick J. Telecky, Jr.

(57) ABSTRACT

This invention reduces leakage power in an integrated circuit design formed of a plurality of design cells selected from a library of cells. The method of this invention considers all design cells, identifies corresponding candidate cells having the same function and swaps a candidate design cell having a least leakage current for the design cell.

7 Claims, 1 Drawing Sheet

METHOD OF LEAKAGE OPTIMIZATION IN INTEGRATED CIRCUIT DESIGN

CLAIM OF PRIORITY

This application claims priority under 35 U.S.C. 119(e)(1) to U.S. Provisional Application No. 60/755,824 filed Jan. 3, 2006.

TECHNICAL FIELD OF THE INVENTION

The technical field of this invention is integrated circuit design for low leakage current.

BACKGROUND OF THE INVENTION

Integrated circuit design involves assembling the combination of circuits that perform the desired function. It is typical to construct the desired circuits from building blocks called cells. Each cell performs a specific function and has a defined set of inputs and outputs. The set of such cells available to the designer is called the library of cells. A selected mix of such cells are assembled depending upon the desired function of the integrated circuit.

Integrated circuit design generally uses a variety of cells which perform the same function. These differing cells are employed in different contexts with differing needs.

A crucial factor in the performance of an integrated circuit is the cell timing. Complex circuits often use the cells in cascade with one or more cell outputs driving another cell input. Integrated circuits are typically clock rate driven. This means that many such serial chains of cells must provide their outputs before the expiration of an interval of time. Proper circuit function depends upon meeting such timing restraints in virtually all of the integrated circuit.

The delay of a cell, that is the length of time from receiving signals at its inputs to generating signals at its outputs is primarily a function of the rail-to-rail supply voltage, the input slew and the output load capacitance. The supply voltage is typically the same for the whole integrated circuit or the integrated circuit is divided into a small number of power domains with differing supply voltages. Thus the metric that has a cascading effect on timing here is the output slew of a cell.

An increasing problem with digital circuits is leakage current. Leakage current is the current a circuit draws when nominally turned OFF. With increased circuit density made possible by smaller circuit features, more circuits can be constructed on a single integrated circuit. In addition, these same smaller features cause increased leakage current for nominally the same circuit types embodied in smaller features. As a consequence, leakage current is a major portion of the total current drawn by state of the art integrated circuits. This increasingly important leakage current causes problems particularly for integrated circuits intended for portable, battery-powered use.

SUMMARY OF THE INVENTION

This invention optimizes the overall leakage power of an integrated circuit design using multiple threshold libraries, without deteriorating the overall timing. Timing driven optimization tools, methods often do not refine drive strengths on paths meeting timing. There might be multiple reasons, majority contributed by ways of interpretation of Non Linear Delay Models in a multi-threshold library. The approaches given here address not only the issues of slew refinements but also swapping across multiple threshold, multiple drive strength cells.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
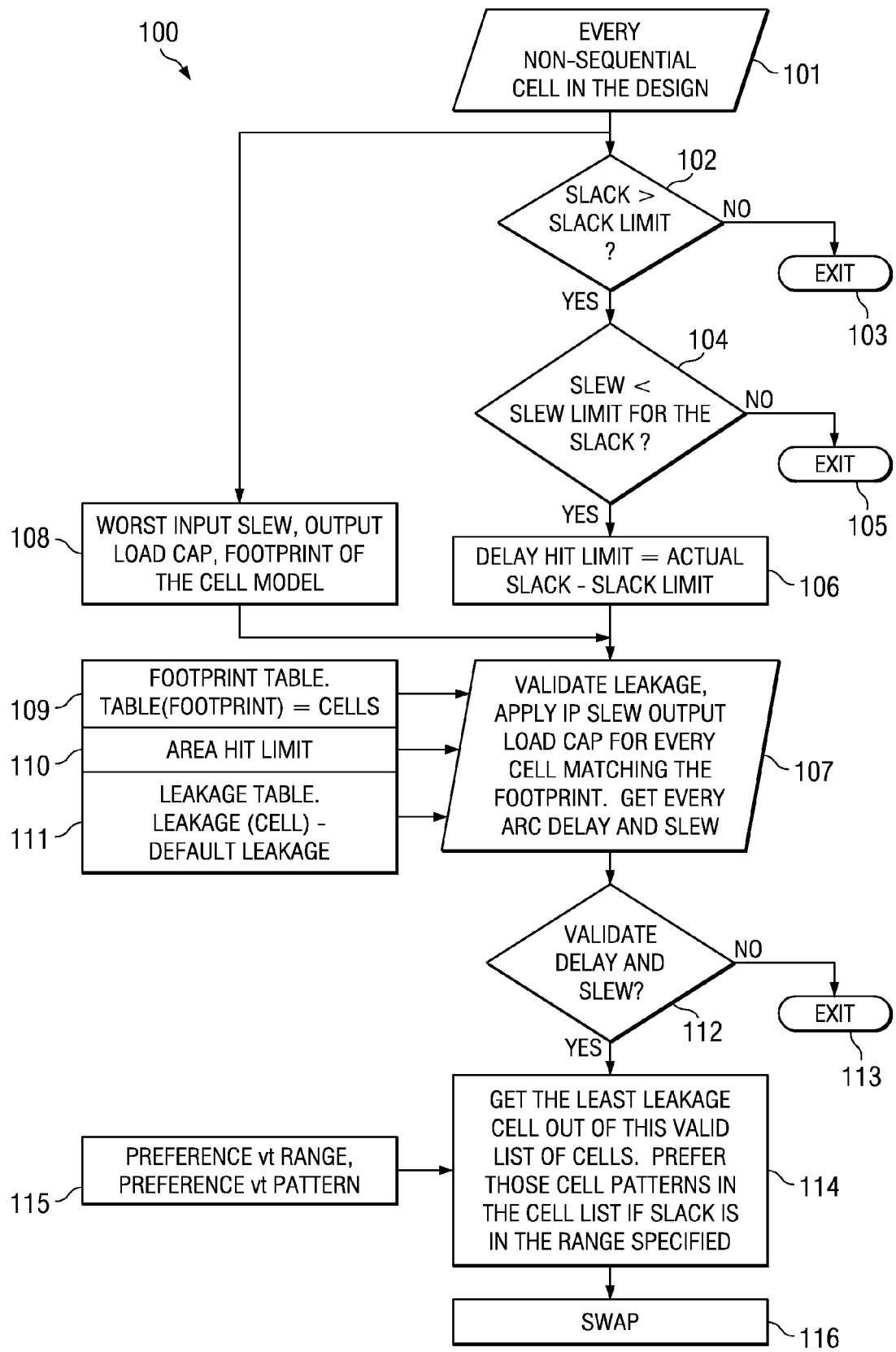
FIG. 1 illustrates the algorithm of this invention in flow chart form.

The delay of a cell is a function of rail-to-rail voltage, input slew and output load capacitance. The factor that has a cascading effect on timing here is the output slew of a cell. Hence in a particular timing path if worst output node slack and slew are well met, then either the cell can be downsized to reduce leakage or can be swapped with a cell with lower leakage. Such a swap preserves timing closure while reducing leakage current. In addition a high drive strength, lower leakage cell can be substituted for a lower drive strength, high leakage cell. The comparisons necessary to determine if such a swap is helpful are made by maintaining a static default leakage hash-table for each cell in the library.

This invention permits multi-threshold-multi-drive swapping by grouping all cells pertaining to a function class. This grouping is based upon the cell footprint. This invention needs to maximize the number of swaps. Picking a random design cell meeting the slack and slew requirements as a swap candidate might not be optimum. Such a cell may eventually have the maximum timing paths passing through it. In this case just one swap can cause failure to make overall timing or prevent swapping other cells in the transitive nodes of the cell preventing further power optimization.

This invention includes the strategies to prioritize design cells while sorting candidates for swapping. These strategies include considering their worst node levels forward or backward, considering dependency and considering worst output slews.

Every standard cell in the library has a cell footprint. Cells with same footprint have same functionality. This invention creates a key-value data base using the footprint as the key and the list of cells with that footprint as value for the key. For a given a footprint as the key to this hash table, the value key will have cells with all drive strengths and threshold voltage classes. This invention also creates plural sequencing databases used in the leakage swap determination.

This invention creates a sequencing database with a forward level metric for each cell. This is similar to creating a backward level hash table, except that the stage calculation starts from the timing start point. From a timing start point, a node is said to be at a forward level n if there are n more stages of logic from a start point which has worst slack.

Traversing from the least forward level towards an endpoint, every cell in a level is checked for its output slack and slew. If one of these cells is overdriving and has enough slack at its output, that cell is a candidate for swapping. Once a candidate is identified thus as swappable, the footprint of the cell is determined and leakage of this candidate cell is compared with leakage of each cell with the same footprint in the library. The cells meeting this criteria are then considered with similar input slew and output load, and checked to determine whether delay and output slew are well within limits. The cells identified as within the limits are sorted by their leakage power. The cell with least leakage power is chosen to swap with the existing cell.

This invention creates a sequencing database with a backward level metric for each cell. Every node in a timing path has an endpoint. The maximum number of logic stages through which the timing path through the node traverses to reach an endpoint defines the backward level of that node. A node may have multiple timing paths running through it and hence have multiple end points. However, the greatest number of stages is considered as the level of that node in a worst case analysis. A cell is at level n, where n is the greatest level amongst all of its outputs.

Traversing from the least backward level towards a start point results in a better quality of result in designs where the total transitive fan-out is greater than the fan-in. Traversing backwards works on the leaf nodes first and then comes to the parent. Thus this technique can swap a maximum number of cells in such designs. But this advantage comes at the small cost of unpredictability. This will be further described below.

This invention creates a sequencing database with a dependency metric for each cell. Dependency is defined by how many timing paths pass through that cell. A cell is said to be at dependency level n where n is the sum of total fan-in timing paths and total fan-out timing paths for that cell for short, transitive start and end points. The less dependent a cell, the less timing impact when swapped. Such a cell will be given preference for swapping.

Traversing from the least dependent level towards the most dependent cell makes sure that the least dependent cells are swapped first. This approach requires a special attention upon implementation to not multiple cells in a cascaded logic path. Consider a water-line like buffer tree structure. Each cell will be at the same dependency level, but only one can be swapped without much computation. This approach will be the most time consuming due to computation of the dependency levels.

This invention creates a sequencing database with a slew metric for each cell. A driver is a strong driver when it drives its load with a faster slew rate. Such strong drivers are prioritized while swapping. If a strong driver has enough positive worst slack and drives with tighter slew rates, then the driver can be downsized enough to meet the limits of slew and slack.

Traversing from the strongest driver towards the lowest, if the input maximum slew is more than maximum slew amongst all inputs and all outputs, a level equal to the sum of maximum input slew and maximum output slew is given to the cell.

This invention uses a set of function subroutines as follows.

getLeakageHash: This static function returns the default leakage hash table. This default leakage hast table supplies the default leakage power given a standard cell name. The default leakage power is edge sensitization independent for multiple input/output cells. This can be made edge dependent only to increase the run-times.

getFootprintHash: This static function returns a footprint hash table with the footprint as key and cell identity with that footprint as the values. This footprint hash table supplies all threshold class and drive strength cells for a given footprint.

getForwardLevelHash: This static function returns a hash table with maximum forward level for a cell as key and cell identity as values. This maximum forward level hash table supplies the maximum forward level of cell outputs for a given cell identity. This function dumps getForwardLevelHash.<designName>.log file.

getBackwardLevelHash: This static function returns a hash table with maximum backward level for a cell as key and cell identity as values. This maximum backward level hash table supplies the maximum backward level of cell outputs for a given cell identity. This function dumps getForwardLevelHash.<designName>.log file.

getDependencyHash: This static function returns a hash table with maximum dependency level for a cell as key and cell identity as values. This maximum dependency level hash table for a cell is the sum of all input node dependencies and output node dependencies. This function dumps getDependencyHash.<designName>.log file.

getSlewLevelHash: This static function returns a hash table with slews found in the design as key and cell identity as values. For the maximum input slew and the maximum output slews if less than the slew limit, cells are assigned slew levels equal to sum of maximum input slew and maximum output slew. This function dumps getSlewLevelHash.<designName>.log file.

getSwapList: This is a dynamic function which accepts master cell identity name, input capacitance, output load, domain, delay deviation limit, upper area variation limit, lower area variation limit, slew limit, voltage threshold ($V_T$) preference pattern and $V_T$ preference slack limit. All of these accept model name, input slew, output load, delay deviation limit and slew limit are static. The model name is design cell model name under consideration, input slew and output load are of that design cell, delay deviation is the allowable deviation/degradation in delay and slew limit is the slew limit for the worst slack of the design cell outputs.

optimizeLeakage: This is the main function which calls all the above functions.

The design to which this application is applied preferably includes a global routed design database and multiple $V_T$ cell library. The following list includes inputs and options for the above functions. Every option has default selected for best results on a reference cell library.

slackLimit: This is a number with a default value of 300 ps. This default value depends upon the technology used and upon the regression tests. A design cell is considered to be eligible for swapping if it has a slack above this limit and has the worst slack.

levelUpdateTimer: This is an integer with a default value of 1. The value of -levelUpdateTime is used to decide after each level swap whether a timer needs to be updated. If levelUpdateTime is set to zero, the total run time would drastically reduce but the quality of results can't be guaranteed. This input is useful for non timing critical blocks.

vtPrefPattern: This is a string with a default value of the cell master identity name if it exists. This option sets the of specific type of $V_T$ for a cell below a certain slack range. If the return list has cells with this pattern, they will be preferred otherwise this option is ignored.

vtPrefSlackLimit: This is a real number with a default value of 300 ps. The $V_T$ cell of -vtPrefPattern is used if the design cell is below this slack range.

upperAreaHitLimit: This is a real number with a default value of 1.5. This is the upper area hit limit. A design cell can be upsized in area up to this factor.

lowerAreaHitLimit: This is a real number with a default value of 0. This is the lower area hit limit. A design cell can be downsized in area maximum by up to this factor. If both upper area hit number and lower hit number are equal, then no area change is allowed. In this case swap is possible only across $V_T$s and not across drive strengths.

maxSlewLimit: This is a real number with a default value of 500 ps. Only design cells with worst slews below this limit will be considered for swapping. This slew target is not to be violated even post swapping.

method: This is a string with a default value of "forward." Valid values are "forward," "backward," "dependency" and "slew." These correspond to the sequencing databases described above.

Apart from these options above, the main function inherits these variables if they exist from the parent shell. Otherwise they assume the listed default values.

slewLimitHash: This is a real number having a default value best suited for the technology node after regression testing. This variable defines the co-ordinates for the slew-slack histogram.

leakagePowerAnalysisCorner: This is a real number having a default value equal to the most commonly used corner for leakage power analysis. This variable sets the leakage analysis corner for picking up right library information.

FIG. 1 illustrates the leakage power optimization process 100 of this invention. Process 100 begins by considering every non-sequential cell in the design at block 101. This selection can be made by any of the four sequencing data bases previously described as determined by the -method switch: forward level metric from the forward level metric hash table produced by the getForwardLevelHash function; backward level metric from the backward level metric hash table produced by the getBackwardLevelHash; dependency metric from the dependency metric hash table produced by the getDependencyHash subroutine; and slew metric from the slew metric hash table produced by the getSlewLevelHash subroutine. Decision block 102 determines if the design cell slack is greater than the slack limit. If this is not true (No at decision block 102), then this design cell cannot be swapped. Process 100 exits via exit block 103. This exit would trigger consideration of the next design cell.

If this is true (Yes at decision block 102), then process 100 tests to determine if the slew of the design cell is less than the slew limit for the slack in decision block 104. If this is not true (No at decision block 104), then process 100 then this design cell cannot be swapped and exits via exit block 105. If this is true (Yes at decision block 104), the process 100 proceeds to block 106. Block 106 sets a delay hit limit equal to the actual timing slack minus the slack limit.

Block 107 coordinates several inputs into a determination of candidate design cells to swap. These inputs include the worst input slew, output load cap and footprint of the cell model from block 108 derived from the non-sequential cells identified by block 101. Another input is the footprint table from block 109 produced by the getFootprintHash subroutine. A third input is the area hit limit from block 110 as controlled by the -upperAreaHitLimit and -lowerAreaHitLimit options. Lastly, is the leakage table indicating the difference between the design cell leakage and the default leakage from block 111 produced by the getLeakageHash subroutine. Block 107 validates the leakage, input slew and output load capacitance for every cell matching the footprint of the design cell.

Decision block 112 validates the delay and slew for these cells. If the delay and slew are not validated (No at decision block 112), then process 100 exits via exit block 113. If the delay and slew are validated (Yes at decision block 112), then process 100 passes to block 114.

Block 114 identifies the ideal swap candidate. Block 114 receives the $V_T$ preference supplied by block 115 as specified by the -vtPrefPattern option. Block 114 also receives the validated candidate cells from decision block 112. Block 114 selects the candidate cell having the best set of characteristics for swapping. Block 116 executes the swap of the selected candidate cell for the design cell.

As previously described, this invention can be applied using forward sequencing, backward sequencing, dependency sequencing and slew sequencing. Using forward sequencing any design cell is considered as a candidate for swapping by its output slew and slack. Following swapping a candidate cell having a degraded slew that is within the slew limits. The slew change propagates through next few stages. The output of this swapped driving cell now has a degraded input slew and the output slew may go beyond the slew limit. This cell thus will not considered in the next iteration as it has slew or slack beyond the limits. To avoid this situation, the slew limits should be tighter for slack ranges than the actual slew limits.

Using backward sequencing considers a leaf cell first and parent cells later. While swapping a leaf cell, the input slew is controlled by the existing parent cell. This input slew may differ when the parent cell is swapped. This degraded parent cell input slew may make the leaf cell swap invalid. This invention has no way to recover/revert/invalidate the original swap if leaf cell delay and slew worsens due to later swaps. This is similar to the limitation in forward sequencing but can be called faulty strategy.

Using dependency sequencing care must be taken to avoid swapping multiple instances in a cascaded water-line logic structures. However, the tighter slew limitation known for forward sequencing holds valid in this case. Among the sequencing approaches, this approach takes the maximum run time.

Using slew sequencing provides no logic to maximize the number of swaps. This approach also has the limitation seen by forward sequencing method requiring a tighter slew limit.

Generally forward sequencing gives better results in designs with more leaf cells in the input direction than in the output direction. Similarly, backward sequencing gives better results in designs with more leaf cells in the output direction than in the input direction. Dependency sequencing takes large run times with lower slack/slew input limits, but is potentially a good approach for timing critical blocks because it is sequenced to run with least impact on design timing. Slew sequencing gives results comparable to forward sequencing and backward sequencing but might take little longer run time than the two.

A tighter slew limit ensures that even after swapping, the slew of the new cell remains good enough and for the next few cell stages the slew doesn't go beyond limits. This invention provides no way to recover, if this happens though. Reversing a prior swap it is out of the scope of this invention. Thus the user of this invention needs to be careful while specifying the slew limits. By specifying loose slew, if few cells go beyond the limits, then user may need to manually fix them. The default values have been tested to give good results on an example library in several test cases.

This leakage optimization algorithm is preferably tested well to run following global route. At this time capacitance and slews are near to realistic. Alternately, this can be run at the detail route phase. In this case the user takes the risk of increased impact on the detail route. This can also be run on a multi-threshold voltage design and is coded to take care of multi-domain delay groups.

What is claimed is:

1. A method of reducing leakage power in an integrated circuit design formed of a plurality of design cells selected from a library of cells for particular circuit functions, the library including a plurality of cells for each circuit function, comprising the steps of:

considering design cells in a predetermined order;

for each considered design cell determining if said design cell had a timing slack greater than a predetermined slack limit;

for each design cell determined to have said timing slack, determining if said design cell has an output slew rate less than a slew limit;

for each design cell determined to have said output slew rate, determining all candidate cells in said library having the function of said design cell;

for all candidate cells for each design cell determining eligible candidate cells which have a size no greater than said design cell, timing slack less than a predetermined slack limit, output slew less than a predetermined output slew limit and leakage current less than said design cell;

for each design cell selecting a candidate cell having the least leakage current; and substituting said candidate cell having the least leakage current for said design cell.

2. The method of claim 1, wherein:
said predetermined order of considering design cells consists of traversing from design cells having the least number of cells in a timing path from a start point to an end point towards design cells having the greatest number cells in a timing path from the start point to the end point.

3. The method of claim 1, wherein:
said predetermined order of considering design cells consists of traversing from design cells having the least number of cells in a timing path from an end point to start point towards design cells having the greatest number cells in a timing path from the end point to the start point.

4. The method of claim 1, wherein:
said predetermined order of considering design cells consists of traversing from design cells having the least number of cells of timing paths passing through said design cell towards design cells having the greatest number timing paths passing through said design cell.

5. The method of claim 1, wherein:
said predetermined order of considering design cells consists of traversing from design cells having the greatest output slew rate towards design cells having the least output slew rate.

6. The method of claim 1, wherein:
said predetermined slack limit is selected to provide more time slack than needed for any timing path of design cells to meet its timing goal.

7. The method of claim 1, wherein:
said library of cells includes for at least one function cells having differing transistor voltage thresholds; and said step of selecting a candidate cell having the least leakage current includes selecting a candidate cell having a preferred voltage threshold.

* * * * *